(12) United States Patent
Jazdzewski et al.

(10) Patent No.: US 9,032,378 B2
(45) Date of Patent: May 12, 2015

(54) AVAILABLE SYMBOL SET GENERATION USING UNTYPED VARIABLE

(75) Inventors: Charles P. Jazdzewski, Redmond, WA (US); Michael C. Fanning, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 653 days.

(21) Appl. No.: 13/329,136

(22) Filed: Dec. 16, 2011

(65) Prior Publication Data
US 2013/0159967 A1   Jun. 20, 2013

(51) Int. Cl.
G06F 9/45   (2006.01)
G06F 9/44   (2006.01)

(52) U.S. Cl.
CPC .. G06F 8/41 (2013.01); G06F 8/313 (2013.01)

(58) Field of Classification Search
None
See application file for complete search history.

(56) References Cited

U.S. PATENT DOCUMENTS

| | | | | |
|---|---|---|---|---|
| 6,952,766 B2 * | 10/2005 | Dervin et al. | | 713/2 |
| 7,493,610 B1 | 2/2009 | Onodera et al. | | |
| 7,669,186 B2 * | 2/2010 | Nolan et al. | | 717/124 |
| 7,958,493 B2 * | 6/2011 | Lindsey et al. | | 717/117 |
| 8,321,836 B2 * | 11/2012 | Meijer et al. | | 717/113 |
| 8,370,807 B2 * | 2/2013 | Campbell et al. | | 717/124 |
| 8,533,669 B2 * | 9/2013 | King et al. | | 717/111 |
| 8,555,250 B2 * | 10/2013 | Fanning et al. | | 717/120 |
| 8,578,334 B2 * | 11/2013 | Nathan et al. | | 717/123 |
| 8,752,020 B2 * | 6/2014 | Daniel | | 717/125 |
| 8,752,035 B2 * | 6/2014 | Fanning et al. | | 717/154 |
| 8,789,018 B2 * | 7/2014 | Fanning et al. | | 717/123 |
| 8,869,106 B2 * | 10/2014 | Jazdzewski et al. | | 717/114 |
| 2002/0133727 A1 * | 9/2002 | Dervin et al. | | 713/310 |
| 2007/0113218 A1 * | 5/2007 | Nolan et al. | | 717/124 |
| 2007/0169036 A1 * | 7/2007 | Garner et al. | | 717/143 |
| 2007/0234288 A1 * | 10/2007 | Lindsey et al. | | 717/117 |
| 2008/0072323 A1 | 3/2008 | Yu | | |
| 2008/0178149 A1 * | 7/2008 | Peterson et al. | | 717/110 |
| 2010/0050159 A1 * | 2/2010 | Daniel | | 717/125 |
| 2010/0235810 A1 | 9/2010 | Campbell et al. | | |
| 2011/0271250 A1 * | 11/2011 | Park et al. | | 717/113 |

(Continued)

OTHER PUBLICATIONS

Inogic, "Debug Script in Microsoft Dynamics CRM," Inogic [online], 2010 [retrieved Jun. 24, 2014], Retrieved from Internet: <URL: http://inogic.com/blog/2010/11/debug-script-in-microsoft-dynamics-crm/>, pp. 1-6.*

(Continued)

*Primary Examiner* — Don Wong
*Assistant Examiner* — Todd Aguilera
(74) *Attorney, Agent, or Firm* — Kevin Sullivan; Aaron Hoff; Micky Minhas

(57) ABSTRACT

The facilitated computation of an available symbol set at code locations in a dynamic language program, in which the program is executed up to a particular halt point for which an available symbol set is to be generated. At the halt point, a type of a value of a particular variable may be used in order to generate the available symbol set. However, at the halt point, the variable does not yet have a value of a useful type (e.g., null or undefined), which is possible in a dynamic language program. Rather than return an error, the principles described herein result in return of an available symbol set anyway. Specifically, the variable had previously been annotated with information representing accessed type information for the variable, even though the variable has not formally been defined. This annotated information may be used to generate the available symbol set.

20 Claims, 8 Drawing Sheets

(56) References Cited

U.S. PATENT DOCUMENTS

| | | | |
|---|---|---|---|
| 2011/0271258 A1* | 11/2011 | Park et al. | 717/127 |
| 2012/0311533 A1* | 12/2012 | Fanning et al. | 717/111 |
| 2012/0311536 A1* | 12/2012 | Fanning et al. | 717/123 |
| 2013/0159968 A1* | 6/2013 | Jazdzewski et al. | 717/114 |
| 2013/0159976 A1* | 6/2013 | Jazdzewski et al. | 717/126 |
| 2013/0159978 A1* | 6/2013 | Jazdzewski et al. | 717/129 |
| 2014/0359572 A1* | 12/2014 | Yuen et al. | 717/111 |

OTHER PUBLICATIONS

Misek, J., et al., Mapping of Dynamic Language Constructs into Static Abstract Sytnax trees, 9th IEEE Int'l Conf. on Computer and Information Science [online], 2010 [retrieved Dec. 19, 2014], Retrieved from Internet: <URL: http://ieeexplore.ieee.org/xpls/abs_all.jsp?arnumber=5590990&tag=1>, pp. 625-630.*

Misek, J., Intellisense Implementation of a Dynamic Language, Charles University in Prague [online], 2009 [retrieved Dec. 19, 2014], Retrieved from Internet: <URL: https://is.cuni.cz/webapps/zzp/detail/65610/?lang=en>, pp. 1-63.*

Haupt, et al., "Type Harvesting: A Practical Approach to Obtaining Typing Information in Dynamic Programming Languages", In Proceedings of the ACM Symposium on Applied Computing, Mar. 25, 2011, pp. 1282-1289.

Haldiman, et al. "Practical, Pluggable Types for a Dynamic Language", In Journal of Computer Languages, Systems and Structures, vol. 35, Issue 1, Apr. 2009, pp. 48-64.

Gal, et al., "Trace-based Just-in-Time Type Specialization for Dynamic Languages", In Proceedings of the 2009 ACM SIGPLAN Conference on Programming Language Design and Implementation, vol. 44, Issue 6, 2009, pp. 465-478.

Ort, Ed, "New JDK 7 Feature: Support for Dynamically Typed Languages in the Java Virtual Machine", Published on: Jul. 2009, Available at: http://java.sun.com/developer/technicalArticles/DynTypeLang/index.html.

Gudeman, David, "Representing Type Information in Dynamically Typed Languages", In Technical Report TR93-27, University of Arizona, Department of Computer Science, Oct. 1993, 40 pages.

* cited by examiner

_US 9,032,378 B2_

AVAILABLE SYMBOL SET GENERATION USING UNTYPED VARIABLE

BACKGROUND

When authoring code in any given software language, it is often helpful for the author to be presented with a list of options for valid references (called "available symbol set") that could be inserted at a particular arbitrary point in the code. Such lists are referred to as "completion lists" as they often assist the author with a list of possible choices for completing a valid expression.

Software languages may be categorized as "dynamic languages" or "static languages". A fundamental characteristic of dynamic languages is that they lack a type system. Thus, the generation of complete and accurate completion lists at arbitrary points in code for dynamic languages is a difficult problem for several reasons. Most significantly, the lack of a type system makes it difficult or impossible to resolve the type of a variable at a specific point in code by means of techniques used by language services written for strongly-typed languages such as C#.

For strong-typed languages, code editors can construct a rich code model based on supporting metadata and/or static analysis of source. For dynamic languages, the most reliable information regarding a variable type is available at runtime. It is difficult, however, to reliably execute code outside of the actual application, web site, or other runtime context. For example, it is difficult to guarantee that execution will halt at a specific point of interest to allow for the analysis to occur at that point in the processing. Furthermore, it is difficult to contrive a set of valid inputs to a specific code segment (e.g., a routine). Past implementations have used such techniques as altering the dynamic language interpreter in order to solve some of these issues.

BRIEF SUMMARY

At least one embodiment described herein relates to the facilitating of computation of an available symbol set for code locations in a dynamic language program, in which the program is executed up to a particular halt point for which an available symbol set is to be generated. At the halt point, completion of the halt point might use a type of a value of a particular variable in order to generate the available symbol set. However, at the halt point, the value does not yet have a useful type from which to generate the available symbol set, which is possible in a dynamic language program.

Rather than return an error, the principles described herein result in return of an available symbol set anyway. Specifically, the variable had previously been annotated with information representing accessed type information for the variable, even though the variable has not formally been defined. For instance, the accessed type information might be an intent regarding how the value of the variable is to be typed. This annotated information may be used to generate the available symbol set.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, computation of an available symbol set at code locations in a dynamic language program is facilitated. The program is executed up to a particular halt point for which an arbitrary symbol set is to be generated. At the halt point, a type of a value of a particular variable may be used to generate the available symbol set. However, at the halt point, the value may not yet have a useful type from which to generate the available symbol set (e.g., a null value or an undefined value), which is possible in a dynamic language program. Rather than return an error, the principles described herein result in return of an available symbol set anyway. Specifically, the variable had previously been annotated with information representing accessed type information for the variable, even though the variable has not formally been defined. For instance, the accessed type information might be an intent regarding how the value of the variable is to be typed. This annotated information may be used to generate the available symbol set.

Figure 1:
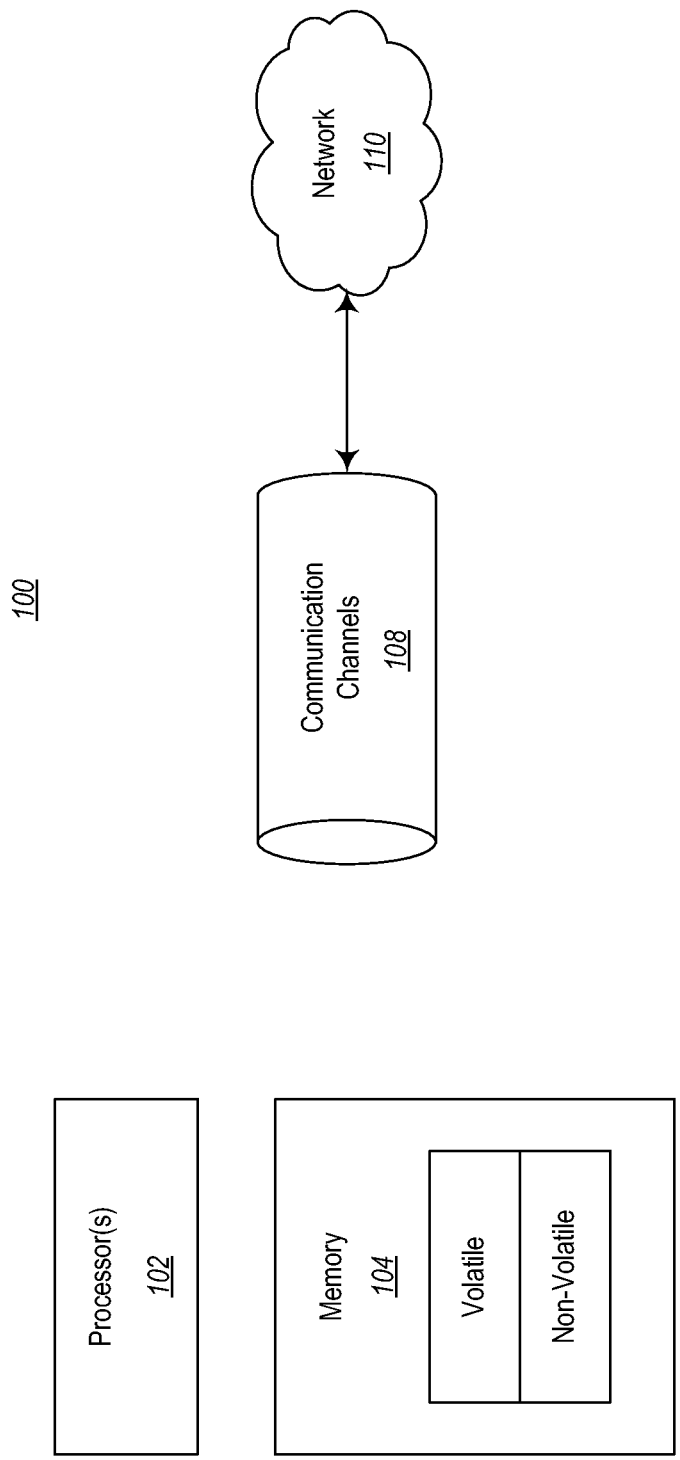
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer. In this description and in the claims, a "computer program product" includes one or more computer storage media having computer-executable instructions thereon that, when executed by the one or more processors of the computing system, perform the function of the computer program product.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

In accordance with embodiments described herein, the annotation of type information to a variable of a dynamic language program is described. Such annotation can be helpful in the generation of available symbol sets (such as completion lists) if, for example, the value whose type is to be analyzed to generate the available symbol set is still not of a useful type from which to directly generate the available symbol set. Static language programs often have a well-defined type structure. In dynamic language programs, on the other hand, the type system is not well-defined, and it is often difficult to tell where a type of a variable was even established or otherwise defined. Further, a single variable can have different types depending on where the execution is in the code. In addition, even a single variable may have multiple value types at different times. For instance, an input parameter dereferenced in a particular location might be a string for one call, and a number for another. Accordingly, the analysis of a dynamic language program can prove to be quite challenging, as such dynamic language programs do not lend themselves to static analysis. Examples of dynamic language programs include scripting languages such as Javascript, Visual Basic Scripting Edition (VBScript), and many others.

Figure 2:
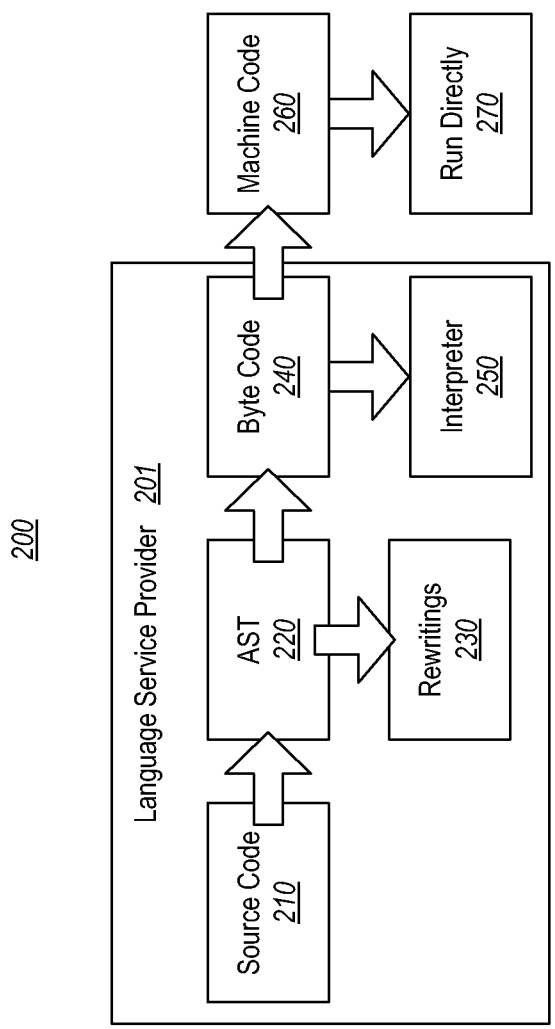
FIG. 2 illustrates an environment that includes a language service provider.

FIG. 2 illustrates an environment 200 that includes a language service provider 201. The environment 200 also shows a certain flow in which some actions and program representations are handled within the language service provider 201, and some actions are handled outside the language service provider 201.

The language service provider 201 begins its analysis with source code 210 of a dynamic language program being authored in its current authoring state (hereinafter referred to as the "current dynamic program"), whether the authoring state represents a point in the process of authoring, or even after authoring, when the correctness of the code is under evaluation. The source code 210 may include the application context as well that gives a description of the actual runtime in which the dynamic language program is anticipated to be executed. More regarding this will be described with respect to FIG. 7 further below. Suffice it to say, for now, that there is more information regarding the runtime environment to allow for more accurate approximation of the actual execution environment in which the dynamic language program would be executed if deployed in its current state.

In some embodiments, the dynamic language program represents just one code segment in a dynamic code sequence. In that case, the application context provides information describing the position of the dynamic language program in the sequence as described below. Furthermore, to improve efficiency of execution, the language service provider 201 may have captured an execution state of the dynamic code sequence prior to execution of the dynamic language program. In that way, when the dynamic language program is to be re-executed, rather than execute all code segments in the dynamic code sequence prior to executing the dynamic language program, the language service provider may set the execution state to be that prior captured state, and then immediately execute the dynamic language program. In addition to the dependency information of the dynamic code sequence, the captured execution state may be included within the application context.

The source code (along with its application context) is at least partially converted into an abstract syntax tree 220. An abstract syntax tree is a tree representation of the syntactic structure of the corresponding source code. Typically, each node in the abstract syntax tree represents a construct of the source code. For any given parent node (corresponding to a parent construct) that has children nodes (corresponding to children constructs), the children construct is a component construct within the parent construct, wherein the child construct and the parent construct have a particular relationship. Abstract syntax trees are known in the art, and thus will not be described in further detail herein. The definition of the term "abstract syntax tree" as used herein is not intended to differ from the ordinary and customary meaning of that term in the art.

However, unlike conventional abstract syntax trees, the abstract syntax tree 220 is subject to transformation by rewriting 230. The abstract syntax tree, whether transformed or not, may then be converted to byte code 240 and interpreted 250 by the language service provider 201. The language service provider 201 detects when execution reaches the halt point and constructs an available symbol set by analyzing program state at the halt point.

Optionally, the byte code 240 may be converted to machine code 260, and such machine code 260 provided as output from the language service provider 201. The machine code 260 may then be directly executed 270 by the environment 200 outside of the language service provider 201 up to the halt point so that the available symbol set may be constructed by analyzing program state at the halt point.

The environment 200 may be implemented by, for example, the computing system 100 of FIG. 1. For instance, the computing system 100 may have access to a computer program product that includes one or more computer-readable media or computer-storage media that has thereon computer-executable instructions that are structured such that, when executed by the processor(s) 102 of the computing system, cause the computing system 100 to provide all or portions of the environment 200.

As a dynamic language program is being authored, the dynamic language program may be executed a number of times at different stages of the authoring process. The method 300 of FIG. 3 may be performed at each of one or more of those different stages of the authoring process. Accordingly, when discussing the method 300, reference to the dynamic language program will often use the modifier "current" (e.g., "current dynamic program") to represent that the method 300 is being performed on the dynamic language program at a particular arbitrary point in the authoring process, and perhaps even after authoring is complete and the correctness of the authored code is being evaluated.

Figure 3:
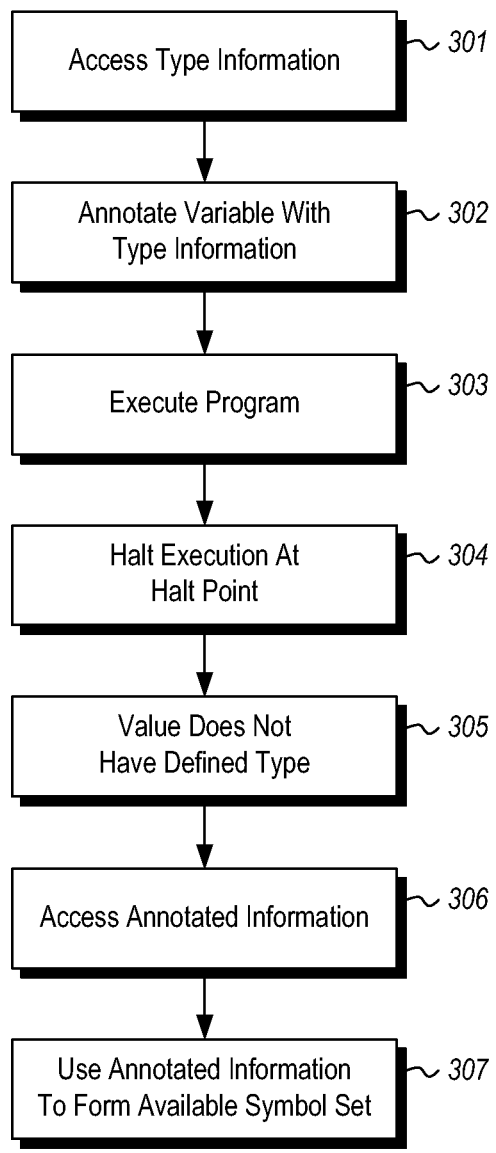
FIG. 3 illustrates a flowchart of a method for a computing system to facilitate computation of available symbol sets for code locations in a dynamic language program by annotating type information.

FIG. 3 illustrates a flowchart of a method 300 for a computing system to facilitate computation of available symbol sets of code locations in a dynamic language program by annotating type information. Type information is accessed for at least one variable of the dynamic language program (act 301). The remainder of the method 300 may be performed for each variable that is to be annotated. As an example, an author might have used the commenting system of the dynamic language program to insert a comment regarding how a variable is intended to be used. Furthermore, the commenting system may attach multiple types to variables. For instance, the annotation might note that a variable is either of type String or Number. The computation of available symbol sets might be able to account for this case (and return a union of possible symbol members, or perhaps return exclusive sets of symbol members, allowing the author or evaluator to choose the most appropriate available symbol set). Alternatively or in addition, the commenting system might note relationships between sets of variables. For instance, the annotation might indicate that parameters A & B are either both Strings or both Numbers (disallowing one being a String while the other is a Number).

The variable is then annotated with information representing the type information (act 302). The manner in which this annotation may be made may differ according to the programming language of the dynamic language program. The annotation is made in a manner that the annotation itself does not serve as a type declaration during execution. Nevertheless, in some embodiments, the annotation is made in a manner that the annotated information remains even if the variable is initialized during execution, and even if the variable does not have a previously defined type. Although not required, the annotation may be deleted during the authoring process before the dynamic language program is deployed.

For instance, to annotate the variable, a candidate value of the identified type may be generated (e.g., by executing the constructor). Then a tracking value of the correct kind (e.g., either null or undefined) may be generated and the variable assigned that value. If, later, that value appears as a result of an expression, the tracking value is used instead of the actual value. In some embodiments, the creation of the tracking value may be deferred although not required.

In some embodiments, the candidate value may be statically determined. For example, consider the following code,

```
var a;
function b( ) {
    a = 1;
}
function c( ) {
    a.|
}
```

Unfortunately, the value of variable a cannot be determined to be a particular type because neither function c nor function b are executed and directed execution forces the execution of c but not b. This can be remedied by looking for initializations of variable a statically and using the initializations to produce a candidate value for variable a. In this case, static analysis would find "a=1" and then rewrite the code to something like the following:

```
var a = trackingUndefined(1);
function b( ) {
    a = 1;
}
function c( ) {
    a.|
}
```

Once the variable is annotated, the current dynamic program is then executed (act 303) until the execution halts at a halt point (act 304). At the halt point, an available symbol set would be derived from the type of the value of the variable. However, upon attempting to determine the type of the variable at the halt point, the method 300 determines that the value of the variable does not have a useful type to formulate the available symbol set at the halt point (act 305). For instance, perhaps the value was never initialized or was initialized with a bottom type such as null or undefined. Rather than returning no available symbol set, the method 300 accesses the annotated information to determine the type information (act 306). Even though the variable does not have a value of a useful type (e.g., has a bottom type) at the halt point, the available symbol set is still generated based on the annotated type information (act 307).

In one embodiment, the variable has a null value. In this case, the annotation may occur to the variable itself such that the execution of the current dynamic program still causes the computing system to treat the variable as having a null value, whereas the annotated information is ignored during execution, or at least preserves the annotated information.

Alternatively, the variable has an undefined value. In this case, the annotation may occur to the variable itself such that the execution of the current dynamic program still causes the computing system to treat the variable as having an undefined value, whereas the annotated information is ignored during execution, or at least preserves the annotated information.

Figure 4:
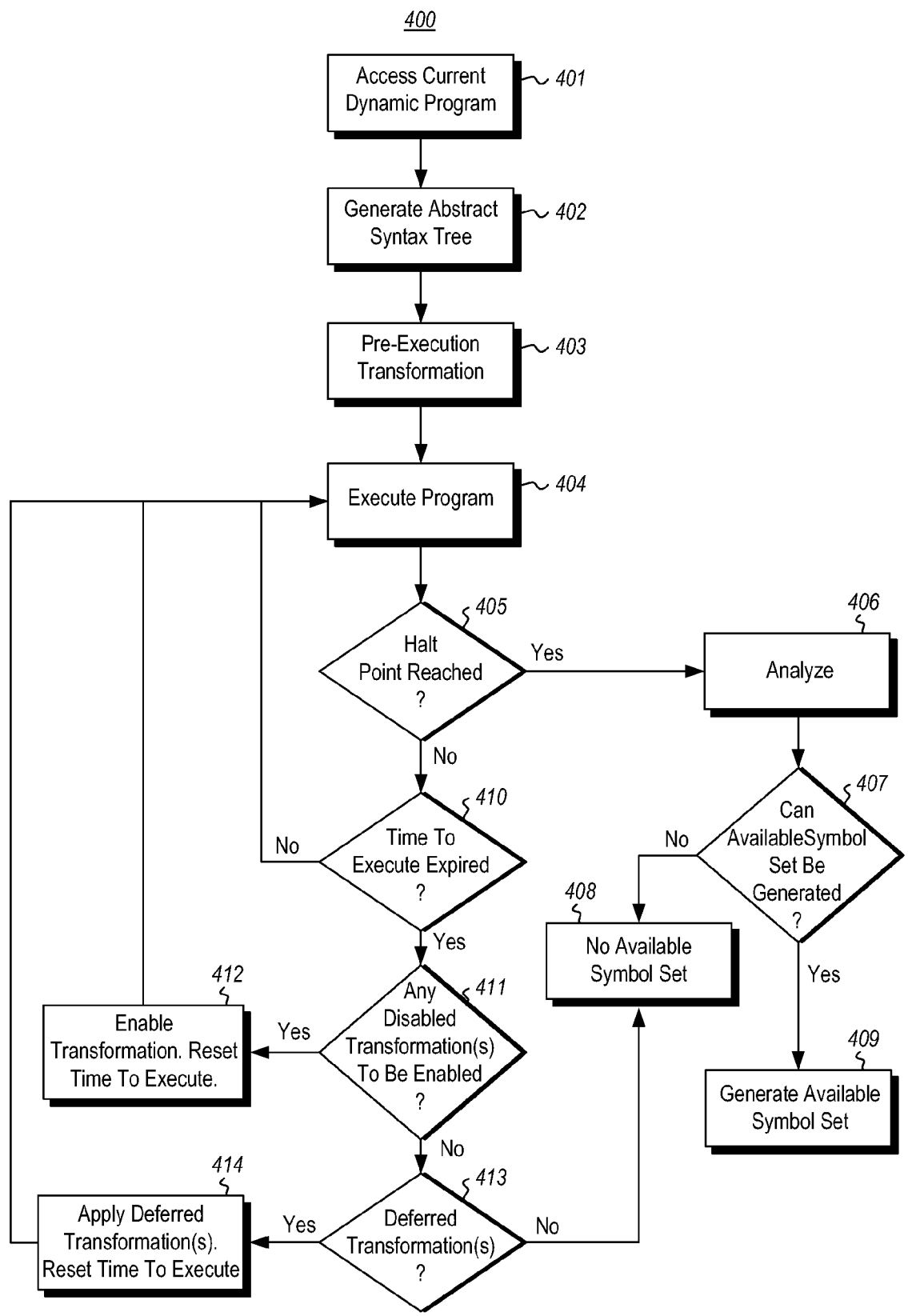
FIG. 4 illustrates a flowchart of a method for facilitating evaluation of a dynamic language program by transforming an abstract syntax tree.

FIG. 4 illustrates a flowchart of a method 400 for facilitating authoring of a dynamic language program. The method 300 of FIG. 3 may be performed in the context of the method 400 of FIG. 4. The method 400 involves facilitating the authoring of a dynamic language program by transforming an abstract syntax tree. As the method 400 of FIG. 4 may be performed in the environment 200 of FIG. 2 (although not required), and the method 300 may be operated in the context of the method 400 of FIG. 4, the method 400 of FIG. 4 will now be described with frequent reference to the environment 200 of FIG. 2 and the method 300 of FIG. 3.

According to the method 400 of FIG. 4, the current dynamic program is first accessed (act 401). As explained previously, the "current" dynamic program represents the dynamic language program as it exists at a particular arbitrary point in the authoring process. Referring to FIG. 2 as an example, the language service provider 201 accesses the source code 210. Although not required, the source code 210 may include source code as well as additional application context. Referring to FIG. 3, the accessed type information (reference act 301) may be already present within the source code. Alternatively or in addition, the annotation (reference act 302) may be present within the source code, or perhaps the current dynamic program may be annotated (act 302) by modifying the abstract syntax tree (as described below) based on the application context.

Referring to FIG. 4, the abstract syntax tree is then generated that represents at least part of the source code (act 402). For instance, in FIG. 2, the language service provider 201 generates abstract syntax tree 220 based on the source code 210. At this point before execution, the language service provider may optionally modify the abstract syntax tree by considering the current dynamic program pre-execution (act 403). Potential reasons for such pre-execution modification of the abstract syntax tree will be described.

As a first example, a current dynamic program that is currently being authored or edited may not be entirely syntactically correct. For instance, the current dynamic program might not be parsed without some errors occurring. The language service provider may provide resilience in these cases, fixing up the code in a sensible way to permit execution to the identified specific point in the code for which the available symbol set is to be generated.

Furthermore, at this point, directed execution transformations may be made. The directed execution transformations are transformations that are made with the purpose of changing the course of execution in a determined way. Examples of further modifications that may be performed include 1) forced conditional modifications in which the abstract syntax tree is modified such that a condition on a condition statement is forced to true, 2) loop guards that force a halting of at least one loop should that loop statement take too long to execute, and 3) a forced exit of a recursion in which the abstract syntax tree is modified to force an exit from a recursion faster than would otherwise occur without the modification.

In a particular embodiment, one or more of the directed execution transformations may be left disabled. In that case, the transformation may be later enabled without again performing an analysis of the application context to thereby later modify the abstract syntax tree. Instead, the transformation is enabled if needed. This may be particularly advantageous as it may not be necessary to ever enable the directed execution transformation. Modifying the course of execution through directed execution transformations may perhaps change the application state at the identified specific location, and thereby perhaps degrade the accuracy of the resultant available symbol set generated by analyzing that application state. Accordingly, by inserting disabled directed execution transformations before execution, the transformations may be made perhaps more efficiently, while leaving open the possibility that the directed execution will not have to be performed.

In one specific embodiment, only loop guard transformations are made at this point, and those loop guard transformations are left disabled. A loop guard forces a halting of at least one loop statement should that loop statement take a long time to execute. This helps in cases in which the halt point resides within a code portion whose execution is delayed by the loop statement. The term "loop statement" is meant to refer to any statement, regardless of language, which causes a code segment to be executed multiple times. Suppose, for example, that the abstract syntax tree originally represented the following source code:

```
while (a)
    work( );
```

In other words, as long as condition a is met, then the function work will be repeatedly executed. This might prevent the halt point from ever being reached, or being reached in a timely manner. The abstract syntax tree may be modified to restrict the loop statement to a particular number of iterations.

```
while (a && _lg1++ < 1000)
    work( );
```

This may be referred to as a "loop guard" (represented as lg1 in the example) since the modification limits the number of times that the whole loop repeats.

Other than syntactical corrections, or directed execution, there may be other reasons to modify the abstract syntax tree even prior to execution. For instance, the abstract syntax tree of the dynamic language program may be altered such that metadata is attached to a variable. Such metadata might be useful specifically for the author (or evaluator) in the context of the dynamic language program being authored (or evaluated). For instance, the metadata might perform the annotation described in method 300 with respect to act 302.

Once appropriate modification, if any, has occurred, the current dynamic program is executed (act 404). Referring to FIG. 2, execution of the current dynamic program is represented by action 250 in which case the byte code 240 is interpreted, or action 270 in which the machine code is directly executed by the environment 200 outside of the language service provider 201. Referring to FIG. 3, act 404 corresponds to act 303.

If, during execution (act 404), a halt point is reached ("Yes" in decision block 405) (corresponding to act 305 of FIG. 3), then the state of the current dynamic program may be analyzed as it exists at the halt point (act 406). In some cases, an available symbol set might not be able to be generated based on such analysis ("No" in decision block 407), in which case no available symbol set is generated (act 408). However, in some cases, and it is hoped most cases, an available symbol set can be generated based on such analysis ("Yes" in decision block 407), in which case the available symbol set is generated (act 409). In some embodiments, the language service provider may use the application context of the dynamic language program in order to generate the available symbol set. It is at this point that if the variable does not have a value of a useful type (act 305) to generate the available symbol set, the annotated information is accessed (act 306), and the available symbol set is calculated based on the annotated information instead (act 307).

If, during execution (act 404), a halt point is not yet reached ("No" in decision block 405), and the time to execute has not yet expired ("No" in decision block 410), then execution continues (act 404). If, during execution (act 404), a halt point has not been reached ("No" in decision block 405), and the time to execute has expired ("Yes" in decision block 410), then this indicates that execution may be taking too long to reach the halt point. The expiration time may be a fixed amount of time that is already determined at the time that execution begins, or it may be a time that is adjusted as execution proceeds. The expiration time might be user configurable.

Accordingly, at this point ("No" in decision block 405, and "Yes" in decision block 410), if there are directed execution transformations that are not enabled ("Yes" in decision block 411), then the directed execution transformations are enabled and the execution time is reset (act 412). For instance, in the case where the loop guards transformations were performed prior to execution (act 403), but were left disabled, those loop guard transformations may now be enabled (act 412). Execution may then be reattempted (act 404) with the aim to reach the halt point ("Yes" in decision block 405) before execution time expires ("Yes" in decision block 410).

If, however, time expires again ("Yes" in decision block 410), and if there are no further opportunities to enabled more disabled directed execution transformations ("No" in decision block 411), it is determined whether there are any deferred transformations that are to be applied to the abstract syntax tree (decision block 413). If there are no such deferred transformations ("No" in decision block 413), then the available symbol set is not generated (act 408). If there are such deferred transformations ("Yes" in decision block 413), then the abstract syntax tree is modified at that time, and the execution time is reset (act 414). For example, any of the example directed execution transformations enumerated above (such as forced conditionals, loop guards, forced recursion exit, or others) may be performed at act 414 instead of or in addition to being performed pre-execution at act 403. In one example, the loop guard transformations are added pre-execution, but disabled, and forced conditionals are deferred to act 414. This process continues until either no available symbol set is generated (act 408) or until an available symbol set is generated (act 409) (which it is hoped would be more common). Then execution is reattempted at act 404. The method 300 of FIG. 3 increases the chance that the decision block 408 will lead to the available symbol set being generated.

Figure 5:
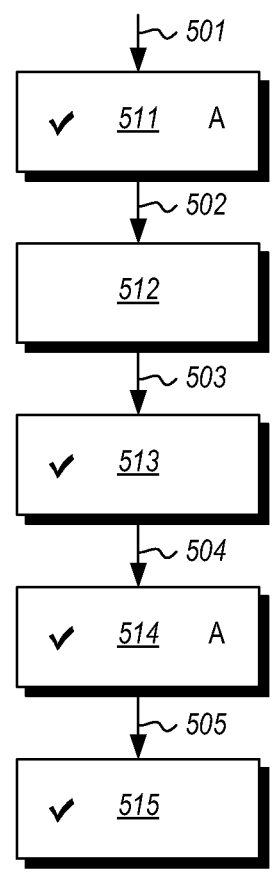
FIG. 5 abstractly illustrates, as an example, five stages of authoring between which abstract syntax tree transformation may occur.

As previously mentioned, the method 300 is performed on a "current" dynamic program representing one or potentially many stages of authoring of the dynamic language program. FIG. 5 abstractly illustrates, as an example, five stages 500 of authoring. The changes in the state of the dynamic language program are represented by arrows 501 through 505, whereas the boxes 511 through 515 represent successive states of the dynamic language program. Five successive states were chosen for FIG. 5 for simplicity only. This principles described herein are not limited to how many successive states of the dynamic language program that exist during the authoring process. Furthermore, the method 300 may be performed on the final dynamic program when evaluating correctness of code after authoring time. Generally speaking, the more complex the dynamic language program, the more states there will be during the authoring process. Regardless, the method 300 may (but is not required to) be performed on each successive dynamic program state. For instance, in the context of FIG. 5, the method 300 may (but is not required to) be performed on each successive dynamic state 511 through 515. Suppose, for example, that the method 300 is performed on states 511, 513, 514 and 515 (but not state 512), as symbolically represented by each of the four states designated with a check mark.

Of those states to which method 300 is applied, perhaps only one or some of them involve annotations of variables with type information. For instance, in FIG. 5, states 511 and 514 involve an abstract tree transformation as symbolically represented by the two boxes having an "A" symbol therein.

Accordingly, the method 300 may be applied to some or all of the successive states encountered during the authoring process, and the type annotation may be performed for some or all of the states to which the method 300 was applied.

Accordingly, the principles described herein provide for a way to offer available symbol sets (such as completion lists) even if the available symbol set is based on a variable which has an undefined type at the halt point. Although not required, the described language service provider 201 may operate within the framework 600 of FIG. 6.

Figure 6:
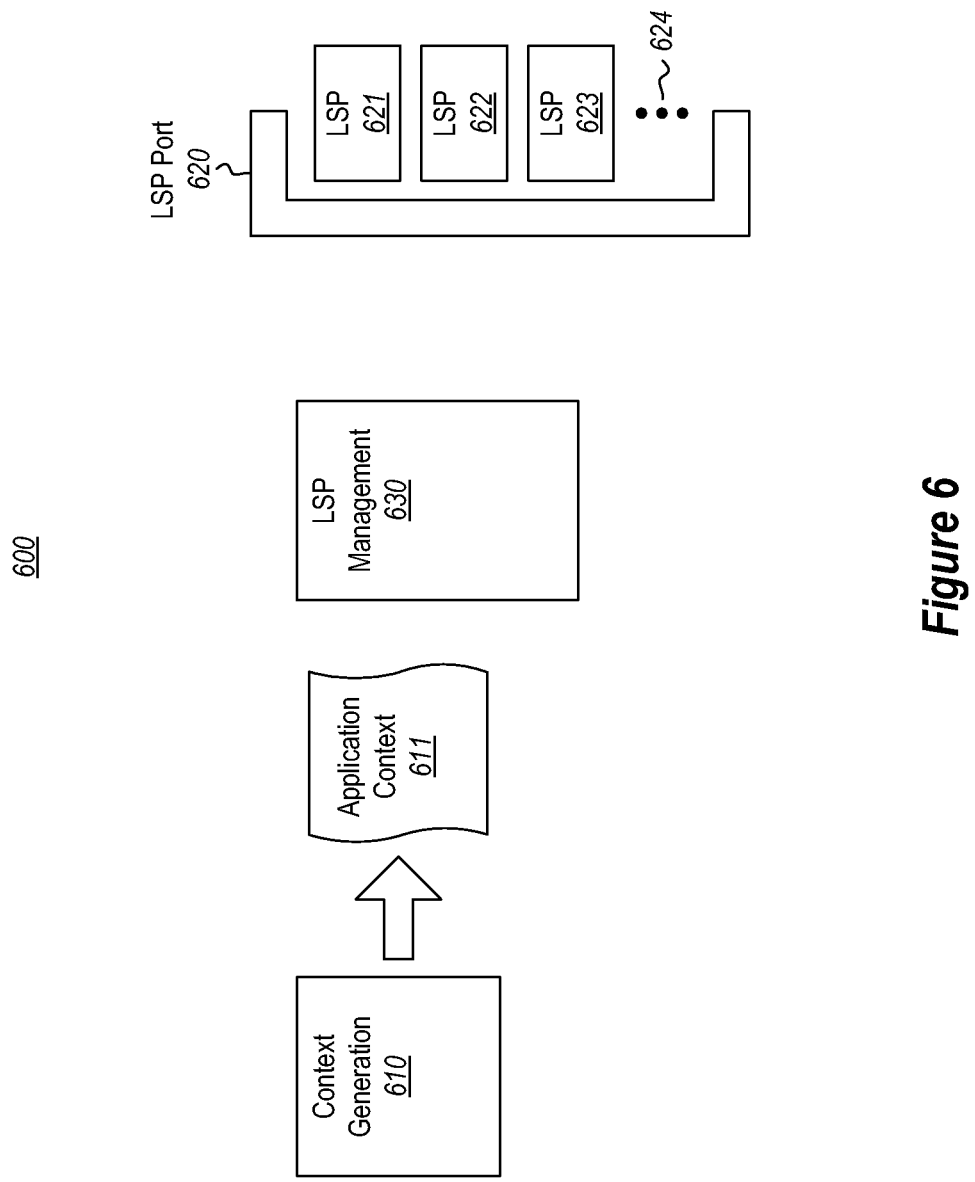
FIG. 6 illustrates a language service provider framework in which the language service provider may operate.
Figure 7:
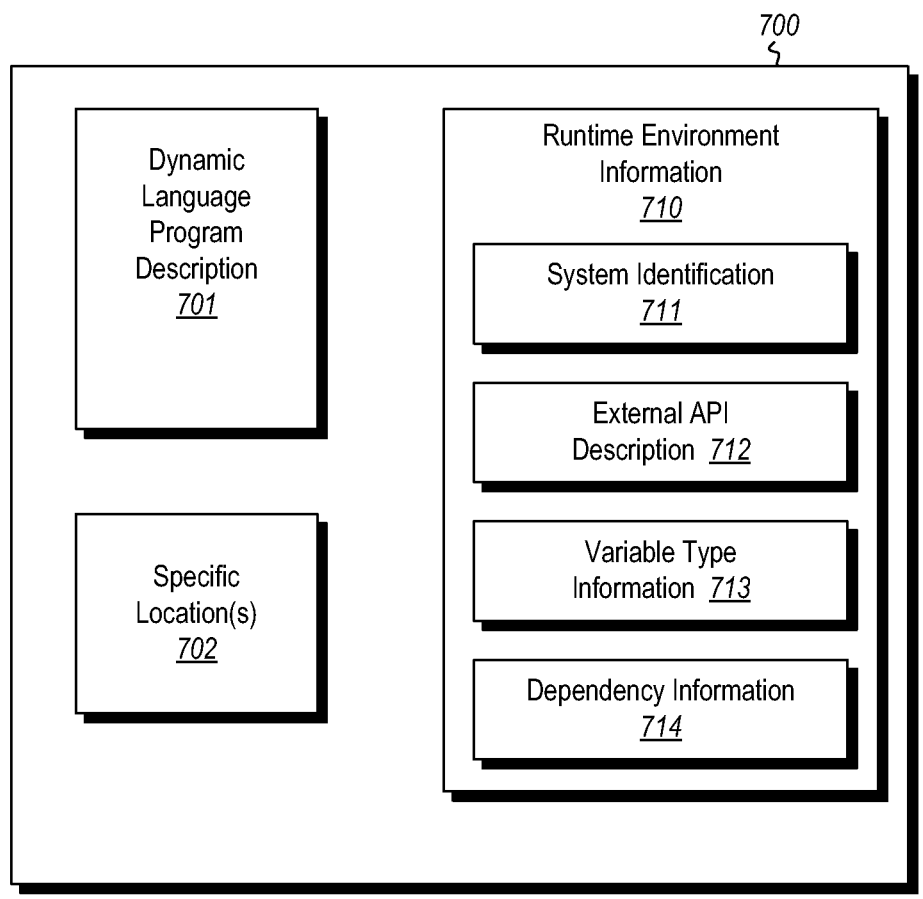
FIG. 7 abstractly illustrates an example of the application context with its various contents.

FIG. 6 illustrates a language service provider framework 600 in which the language service provider 201 may operate. The language service provider framework includes an application context generation component 610 that generates an application context 611 of a dynamic language program being authored. FIG. 7 abstractly illustrates an example of the application context 700 with its various contents. The application context 700 includes a description of the dynamic language program 701, an identifier for one or more specific locations 702 within the dynamic language program, and runtime environment information 710. In some embodiments, the elements of the application context 700 may be explicitly identified within the application context. In this way, different language service providers may interpret the schema of the application context, and provide their own processes for handling the elements of the application context.

The dynamic language program description 701 could include, for instance, the source code of the dynamic language program. The runtime environment information 710 may include system identification 711. This system identification 711 may include an operating system identifier or a browser identifier. However, the system identification might also include a set of versions of environmental software (e.g., operating system or browser) in which the dynamic language program might operate. In this case, the language service provider might provide for a common subset of available APIs (that are common to all of the versions in the set) when executing the dynamic language program. The doc type/doc mode may also be included as the application context generation component 610 and may acquire this information from user configuration, or project type information corresponding to the dynamic language program. The doc mode qualifies the available API's. In this way, a new browser version can provide backwards compatibility for mark-up written against previous versions.

The runtime environment information 710 might also include a description of at least a portion of available external Application Program Interfaces (APIs) 712, and type information 713 for multiple variables in the dynamic language program.

The runtime environment 710 might also include dependency information 714 regarding whether and what execution resources the dynamic language program being authored depends on. As an example, perhaps the dynamic language program is not to be executed until another program executes.

In some embodiments, the dynamic language program description 701 may simply be the file being authored and that is currently being edited. In some embodiments, the dynamic language program description file could be the sole source of information regarding dependency information 714 or other application context used to generate an available symbol set. This could include in-source comments that describe dependencies (such as utilization of an external framework library such as JQuery), dependencies that can be determined statically from actual code (such as dynamic insertion of a <script> element with a specific URL), and/or code that dynamically loads script which cannot be statically determined (described further below).

The dynamic language program description 701 may also include other application code. Conceptually, this is code that is part of the application under development in that this application code is not an external dependency. This other application code may be in the form of files, and generally do not use special handling to acquire. This is because they are persisted and/or managed locally or as part of a storage mechanism for which the user has permissions. They also do not imply special handling in terms of security in that the code is trusted for execution. In some embodiments, application code is denoted by 1) its existence in an application project file (for environments that track project items and other configuration details in this way), 2) its presence in a specific directory/other writable location (for environments which construct a project based on the contents of a directory), and/or 3) an in-source reference to a file via a relative URL (in this case, the file should exist in the proper relative relationship wherever project files are persisted).

An application might refer to an external JS file (such as the JQuery framework). These files can be referenced in the same manner as application code, by in-source reference (as external URL), in a project file (again as an external URL), or requested during execution itself. Two related issues in files of this kind are that they are not trusted and are not internal to the machine. For these cases, the framework 600 may provide a download mechanism and potentially rewrite the source under analysis to refer to the locally cached copy. Merely requesting an external resource on the web can provoke certain types of security issues, so there may be settings and/or a user-driven approval process for performing the fetch.

There are several advantages to having these files cached locally. For instance, performance may be improved, may be made more deterministic, and this may allow more flexibility as far as sandboxing execution. The framework 600 may identify unverified files that a user has downloaded from the internet and added to the project file, in contrast with an environment in which the downloaded code is simply trusted. On NTFS file systems, these files will be marked with a bit indicating they have been downloaded from the internet, in which case the framework 600 could follow the same user experience as for untrusted code (including removing the unsafe bit from the file if the user approves).

As for implied dependencies, there are several categories of callable API that are not expressed as code that is parsed/interpreted/executed by a runtime. These include 1) DOM API, 2) other external API, and 3) surrogate code. Each will now be explained.

As for DOM API, a significant portion of JavaScript executes in a browser environment, in which the browser/script host populates the execution environment with a large body of callable API (such as the window and document objects). This API varies by browser provider, by browser version, and by document doctype/docmode. For instance, an HTML document can be authored to explicitly force the document into a specific doc mode, which implies a specific available DOM API. In some embodiments, this implied callable DOM API is expressed as JavaScript that, when executed, populates the runtime with appropriate objects/methods.

As for other external APIs, any script host has the ability to extend callable API at runtime. Many execution environments also provide interoperability mechanisms (such as web services and COM activation) with implied API. These also can be provided in the system as executable JavaScript. Thus, system identification 711 may include external APIs that are not native to the dynamic language runtime.

As for surrogate code, in some cases, for perhaps reasons of performance, convenience, or security, source code that exists and is actually parsed/executed in real world execution might be replaced by surrogate JavaScript code that can be executed in context of the language.

Absent a well-maintained and properly ordered set of in-source annotations describing a JS file's dependencies, an HTML file that consumes some JavaScript can be very helpful for determining references as well as proper ordering of file load (since any HTML file organizes its script elements properly in order for code to execute correctly). The framework 200 permits JavaScript files to provide a reference to an HTML file that consumes it in order to identify what other JS code it might depend on and in what order they should load. This can save significant developer maintenance costs. HTML also can contain embedded code (e.g., within <script> elements or as embedded script associated with event handlers) that should be extracted and passed to the language service (since a file under edit might itself depend on this code). Finally, some browsers populate the JS callable API with variables that represent HTML elements expressed in the mark-up. In Internet Explorer, for example, any DIV marked with an ID can be referred to from JavaScript directly by that ID (rather than acquiring it via getElementById). For this case, the HTML would be parsed looking for elements with an ID and then construct surrogate JS that populates the global namespace with the appropriate set of identifiers.

These categories are useful for driving user experience/configuration, potentially dictate handling in the general framework itself and could imply special handling in a language service provider. Users might configure a project for a web application as targeting only a specific version of a browser. As mentioned, the infrastructure might treat external code with more care than trusted application code. When calculating a closure of dependencies that might be in play for editing a specific file, the infrastructure might also make decisions based on these categorizations. The downloader might not aggressively parse external files, for example, for a complete closure of its possible dependencies but depend instead on the hooks in the engine to identify when that external code itself pulls in other files.

Referring to FIG. 6, the language service provider framework 600 includes a language service provider port component 620 configured to hold one or more language service providers. For instance, as illustrated, the language service provider port component 620 holds three language service providers 621, 622 and 623. However, the ellipses 624 represents that there is flexibility in how many language service providers are made available to the language service provider port component 620. The language service provider 201 may represent an example of one of the language service providers 621 through 624.

Figure 8:
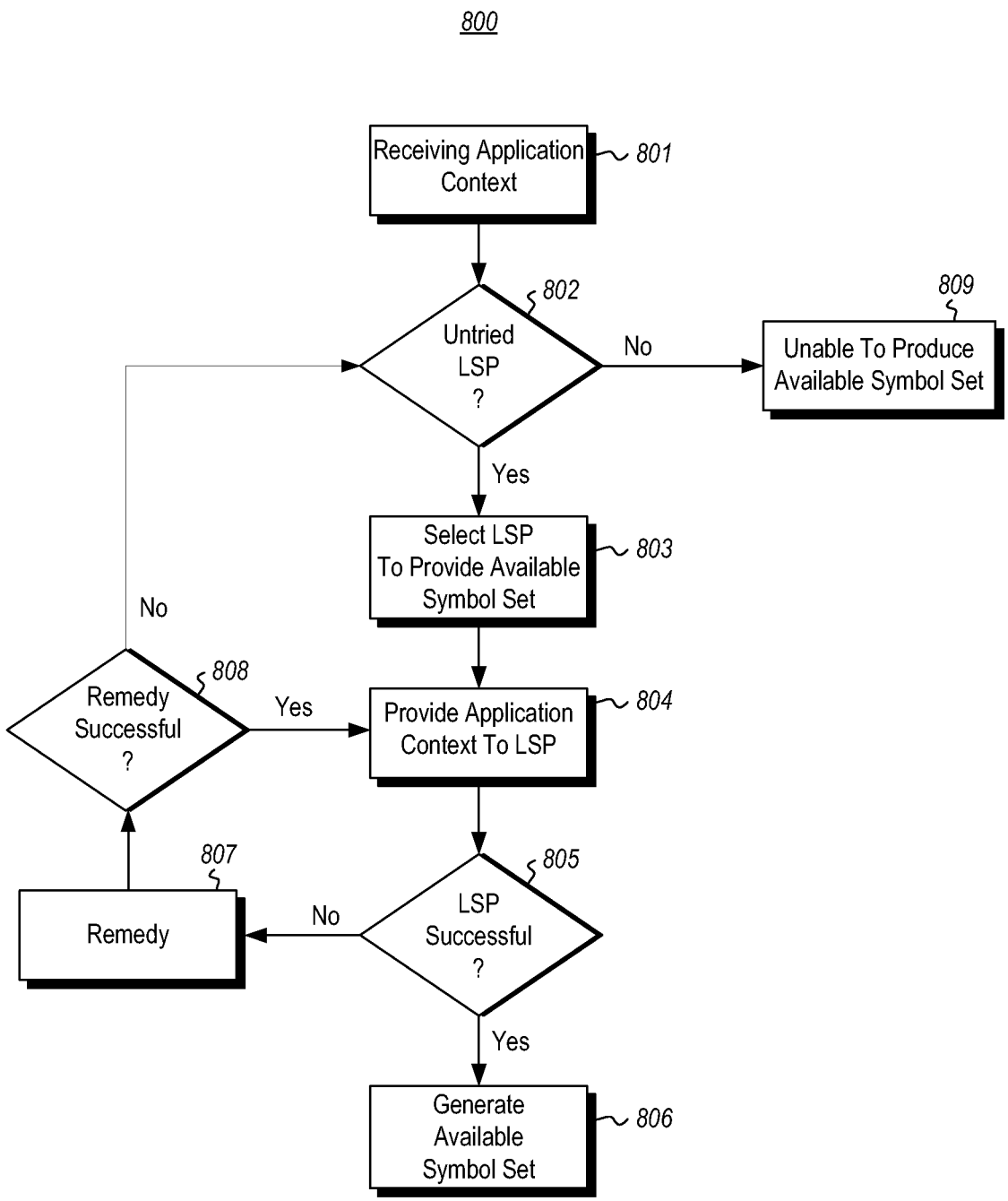
FIG. 8 illustrates a flowchart of a method for managing multiple language service providers.

The language service provider framework 600 also includes a management component 630 that is configured to manage use of the various language service providers available to the framework 600. FIG. 8 illustrates a flowchart of a method 800 for managing multiple language service providers. As the method 800 may be performed by the management component 630 of FIG. 6, the method 800 of FIG. 8 will now be described with frequent reference to the framework 600 of FIG. 6.

In accordance with the method 800, the management component receives an application context from an application context generation component (act 801). For instance, referring to FIG. 6, the management component 630 receives the application context 611 from the application context generation component 610.

If there are any language service providers that have not yet been tried ("Yes" in decision block 802), then the management component selects a language service provider (act 803) that is to provide the available symbol set. At this point, the method 800 has not yet tried any language service providers, and thus if there are multiple available language service providers, then the management component 630 selects one of those available language service providers. For instance, referring to FIG. 6, the management component 630 may choose from any of the language service providers 621, 622 or 623. The selection of language service provider may be made based on, for example, user preferences. For instance, perhaps the user prefers to use language service provider 621. In that case, the selection may default to the language service provider 621, or at least the language service provider 621 would be weighted more heavily with other factors in the selection process that it would be without being the user default.

The selection may also be based on a default selection. For instance, perhaps language service provider 622 is selected by the management component 630 by default, absent a contrary indication by the user.

Alternatively or in addition, the selection might also be based on an evaluation of historical performance of each of the available language service providers. For instance, perhaps language service provider 621 tends to supply available symbol sets that are higher quality and in a faster time than the other language service providers 622 and 623. This excellent historical performance may be tracked by the management component 630, causing the management component 630 to select the language service provider 621 as a provider of first resort. Conversely, a language service provider that crashes might be permanently disabled or disabled for a specific file.

In some embodiments, the management component 630 might operate a language service provider in a condition in which the language service provider is prevented from performing certain actions. This is often termed "sandboxing". The management component 630 may further disable the language service provider if it attempts to perform a forbidden action. This reduces the risk posed by rogue language service providers, thereby lessening the risk of trying new language service providers. The management component 630 may also have a mechanism for removing the language service provider from the sandboxed condition once the language service provider satisfies one or more trust tests.

Once the language service provider is selected (act 803), the management component provides the application context to the selected application service provider (act 804). The selected language service provider then processes the application context with the aim to generate an available symbol set (e.g., perhaps so that the available symbol set may be used to build a completion list) corresponding to each of at least one of the one or more specific locations 702. If the language service provider is successful ("Yes" in decision block 805), then the available symbol set is generated (act 806). For instance, in FIG. 6, suppose that the management component 630 selects language service provider 621. The language service provider 621 would then process the application context provided by the management component 630, and if successful in generating an available symbol set, would provide the available symbol set to the management component 630. The management component 630 could then visualize the available symbol set (perhaps through a completion list, although not required) to the author of the dynamic language program, to assist the author in further authoring the dynamic language program.

If the language service provider is not successful in generating a satisfactory available symbol set ("No" in decision block 805), then the management component 630 may attempt to remedy (act 807). For instance, the language service provider may be considered not successful if it does not generate the available symbol set in an acceptable amount of time. If the remedy is successful ("Yes" in decision block 808), the management component may provide the application context back to the selected language service provider (act 804) to reattempt the language service provider (decision block 805). For instance, the management component 630 may then cause the dynamic language program to be rewritten in an attempt to remedy the problem prior to having the language service provider reattempt execution.

On the other hand, if the remedy is not successful ("No" in decision block 808), then another language service provider may be tried if available (decision block 802). For instance, suppose in that language service provider 621 was first attempted unsuccessfully. At decision block 802, there are still two more language service providers 622 and 623 that have not yet been tried. Thus, there are still more untried language service providers ("Yes" in decision block 802). The management component 630 then again selects one of the language service providers (suppose language service provider 622), and provides the application context to the selected language service provider (act 804). If the language service provider 622 is successful ("Yes" in decision block 805), then the available symbol set is generated (act 806). Otherwise, if the language service provider is not successful ("No" in decision block 805), and the situation is not remedied ("No" in decision block 807), then the final language service provider may be tried.

At decision block 802, there is still one more language service provider 623 that has not yet been tried. Thus, there are still more untried language service providers ("Yes" in decision block 802). The management component 630 then again selects one of the language service providers. In this case, the selection would be trivial as there is only one more untried language service provider 623. Accordingly, the management component 630 provides the application context to the selected service provider (act 805). If the language service provider 623 is successful ("Yes" in decision block 805), then the available symbol set is generated (act 806). Otherwise, if the language service provider is not successful ("No" in decision block 805), and the situation is not remedied ("No" in decision block 807), the method 800 returns to decision block 802.

However, now there are no further untried language service providers ("No" in decision block 802) at this point. Accordingly, the management component 630 is unable to generate an available symbol set (act 809). However, at this point, the management component 630 had tried three language service providers and tried to remedy the lack of success in each case. Thus, it may be a truly rare circumstance that the method 800 is unable to generate the available symbol set.

The management component 630 may perform a number of additional tasks. For instance, the management component 630 may be configured to select a fall-back ordering of the language service providers in case of a failure of one or more of the language service providers to provide acceptable symbol sets. For instance, referring to FIG. 6, the management component 630 may determine that it should first attempt generation of the symbol set using the language service provider 621, and if not successful, then language service provider 623, and if not successful, then language service provider 622.

Alternatively or in addition, the management component 630 may register new language service providers as they are added to the language service provider port component 620. Alternatively or in addition, the management component 630 may additionally search for available language service providers that could be plugged into the language service provider port component. Alternatively or in addition, the management component 630 may capture environmental state upon completion of execution of dynamic language programs.

Accordingly, the principles described herein provide for type annotation of variables in order to more consistently generate a completion list in the authoring of a dynamic language program. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method which, rather than returning an error when a variable is encountered at a particular location in a dynamic language program that does not have a value of a useful type from which to formulate an available symbol set, nonetheless facilitates computation of an available symbol set for the encountered variable at the particular code location in the dynamic language program, the computer-implemented method comprising acts of:

accessing type information for one or more variables of a dynamic language program;

annotating the one or more variables with information that does not declare a particular type for the one or more variables, but wherein the information aids in determining type information for the one or more variables;

accessing source code for a current dynamic program which represents the dynamic language program in a current authoring state;

converting the source code for the current dynamic program into an abstract syntax tree representation of the syntactic structure of the source code;

generating from the abstract syntax tree byte code and processing the byte code by either:
  interpreting the byte code in a language service provider environment; or
  converting the byte code to machine code which is executed outside of the language service provider environment;

irrespective of whether the current dynamic program is interpreted as byte code in the language service provider environment or is executed as machine code outside of the language service provider environment, halting execution of the current dynamic program at a halt point where an available symbol set is required for a value of the encountered variable;

determining at the halt point that the encountered variable does not have a value of a useful type from which to formulate an available symbol set;

at the halt point, in response to determining that the encountered variable does not have a value of a useful type, accessing the annotated information to determine type information of the encountered variable; and rather than returning an error because the encountered variable does not have a value of a useful type from which to formulate an available symbol set, generating an available symbol set based on the annotation information.

2. The computer-implemented method in accordance with claim 1, wherein the dynamic language program comprises a plurality of different authoring stages each corresponding to a change in state of the dynamic language program.

3. The computer-implemented method in accordance with claim 2, wherein the computer-implemented method of claim 1 is performed for some but not all of the different authoring stages.

4. The computer-implemented method in accordance with claim 1, wherein at the halt point, the variable has a null value.

5. The method in accordance with claim 4, wherein annotating the one or more variables occurs by assigning a value to any of the one or more variables that are treated as a null value, but which also includes the annotated information.

6. The computer-implemented method in accordance with claim 1, wherein at the halt point, the variable has an undefined value.

7. The computer-implemented method in accordance with claim 6, annotating the one or more variables occurs by assigning a value to any of the one or more variables that are treated as an undefined value, but which also includes the annotated information.

8. The computer-implemented method in accordance with claim 1, wherein the information that is annotated for the one or more variables remains even if the variable at the halt point is initialized.

9. The computer-implemented method in accordance with claim 1, wherein the information that is annotated for the one or more variables remains even if the variable at the halt point is not previously defined.

10. The computer-implemented method in accordance with claim 1, wherein the information that is annotated for the one or more variables is deleted prior to deployment.

11. A computer program product comprising one or more hardware devices storing computer-executable instructions that, when executed by one or more processors, cause a computer-implemented method to be performed which, rather than returning an error when a variable is encountered at a particular location in a dynamic language program that does not have a value of a useful type from which to formulate an available symbol set, the computer-implemented method nonetheless facilitates computation of an available symbol set for the encountered variable at the particular code location in the dynamic language program, the computer-implemented method comprising acts of:
    accessing type information for one or more variables of a dynamic language program;
    annotating the one or more variables with information that does not declare a particular type for the one or more variables, but wherein the information aids in determining type information for the one or more variables;
    accessing source code for a current dynamic program which represents the dynamic language program in a current authoring state;
    converting the source code for the current dynamic program into an abstract syntax tree representation of the syntactic structure of the source code;
    generating from the abstract syntax tree byte code and processing the byte code by either:
        interpreting the byte code in a language service provider environment; or
        converting the byte code to machine code which is executed outside of the language service provider environment;
    irrespective of whether the current dynamic program is interpreted as byte code in the language service provider environment or is executed as machine code outside of the language service provider environment, halting execution of the current dynamic program at a halt point where an available symbol set is required for a value of the encountered variable;
    determining at the halt point that the encountered variable does not have a value of a useful type from which to formulate an available symbol set;
    at the halt point, in response to determining that the encountered variable does not have a value of a useful type, accessing the annotated information to determine type information of the encountered variable; and
    rather than returning an error because the encountered variable does not have a value of a useful type from which to formulate an available symbol set, generating an available symbol set based on the annotation information.

12. The computer program product in accordance with claim 11, wherein at the halt point, the variable has a null value.

13. The computer program product in accordance with claim 12, wherein annotating the one or more variables occurs by assigning a value to any of the one or more variables that are treated as a null value, but which also includes the annotated information.

14. The computer program product in accordance with claim 11, wherein at the halt point, the variable has an undefined value.

15. The computer program product in accordance with claim 14, wherein annotating the one or more variables occurs by assigning a value to any of the one or more variables that are treated as an undefined value, but which also includes the annotated information.

16. The computer program product in accordance with claim 11, wherein the information that is annotated for the one or more variables remains even if the variable at the halt point is initialized or is not previously defined.

17. The computer program product in accordance with claim 11, wherein the information that is annotated for the one or more variables is deleted prior to deployment.

18. The computer program product in accordance with claim 11, wherein the dynamic language program comprises a plurality of different authoring stages each corresponding to a change in state of the dynamic language program.

19. The computer program product in accordance with claim 18, wherein the computer-implemented method of claim 1 is performed for some but not all of the different authoring stages.

20. An architecture for a computing system which, rather than returning an error when a variable is encountered at a particular location in a dynamic language program that does not have a value of a useful type from which to formulate an available symbol set, nonetheless facilitates computation of an available symbol set for the encountered variable at the particular code location in the dynamic language program, comprising:
    annotating one or more variables with information that does not declare a particular type for the one or more variables, but wherein the information aids in determining type information for the one or more variables;

a language service provider accessing source code for a current dynamic program which represents a dynamic language program in a current authoring state;

the language service provider comprising:

a component that converts the source code for the current dynamic program into an abstract syntax tree representation of the syntactic structure of the source code; and a component that generates from the abstract syntax tree byte code and then passes the byte code for processing by either interpreting the byte code in an interpreter of an environment of the language service provider, or converting the byte code to machine code which is executed outside of the environment;

a memory storing executable instructions; and one or more processors which execute the executable instructions to implement the following computer-implemented method:

irrespective of whether the current dynamic program is interpreted as byte code in the environment of the language service provider or is executed as machine code outside of the environment, halting execution of the current dynamic program at a halt point where an available symbol set is required for a value of the encountered variable;

determining at the halt point that the encountered variable does not have a value of a useful type from which to formulate an available symbol set;

at the halt point, in response to determining that the encountered variable does not have a value of a useful type, accessing the annotated information to determine type information of the encountered variable; and rather than returning an error because the encountered variable does not have a value of a useful type from which to formulate an available symbol set, generating an available symbol set based on the annotation information.

* * * * *